Feb. 14, 1961 W. A. BARTEL 2,971,774
DOUBLE IMPLEMENT DRAWBAR
Filed Jan. 6, 1960 2 Sheets-Sheet 1

Walter A. Bartel
INVENTOR.

Feb. 14, 1961   W. A. BARTEL   2,971,774
DOUBLE IMPLEMENT DRAWBAR
Filed Jan. 6, 1960   2 Sheets-Sheet 2

Walter A. Bartel
INVENTOR.

United States Patent Office 2,971,774
Patented Feb. 14, 1961

2,971,774
DOUBLE IMPLEMENT DRAWBAR
Walter A. Bartel, Fairview, Okla.
Filed Jan. 6, 1960, Ser. No. 737
4 Claims. (Cl. 280—412)

The present invention generally relates to a drawbar assembly for towing farm implements behind a tractor and more particularly is a novel structural arrangement for towing a pair of implements such as two grain drills, two field cultivators or any similar implements.

In many farm operations, it is desirable to tow a plurality of implements across a field so that a maximum width of the field will be cultivated, drilled or otherwise conditioned by a single pass of the tractor. In order to accomplish this, it is necessary to orientate the implements so that their paths of travel are disposed in side-by-side relation. However, such implements are quite often pulled to the field over a road surface and through a gate opening. When this is being done, the implements cannot be disposed with their paths of movement side-by-side since their width precludes this. Rather, it is necessary that the implements be disposed in tandem relation or one behind the other when being towed over the road. In order to accomplish this, it is usually necessary to unhook both of the implements from the drawbar and completely reorientate them in relation to each other and in relation to the tractor drawbar. This is time consuming and also requires considerable effort due to the usual weight and bulkiness of such implements and sometimes may result in injury due to the heaviness of the implements involved.

Therefore, it is the primary object of the present invention to provide a novel double implement drawbar incorporating a structural arrangement which will effectively pull a pair of implements such as grain drills behind the tractor so that their paths of movement are side-by-side and subsequently being easily converted to an over the road condition so that the implements are disposed in tandem relation without unhitching the implements from the drawbar assembly and without disconnecting the tractor from the drawbar assembly with it only being necessary to remove and reinsert a single pin and to adjust a single supporting wheel.

Another object of the present invention is to provide a drawbar in accordance with the preceding object which is extremely simple in construction, easily converted from a field setting to an over the road setting, rugged in structure, well adapted for its particular purposes and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
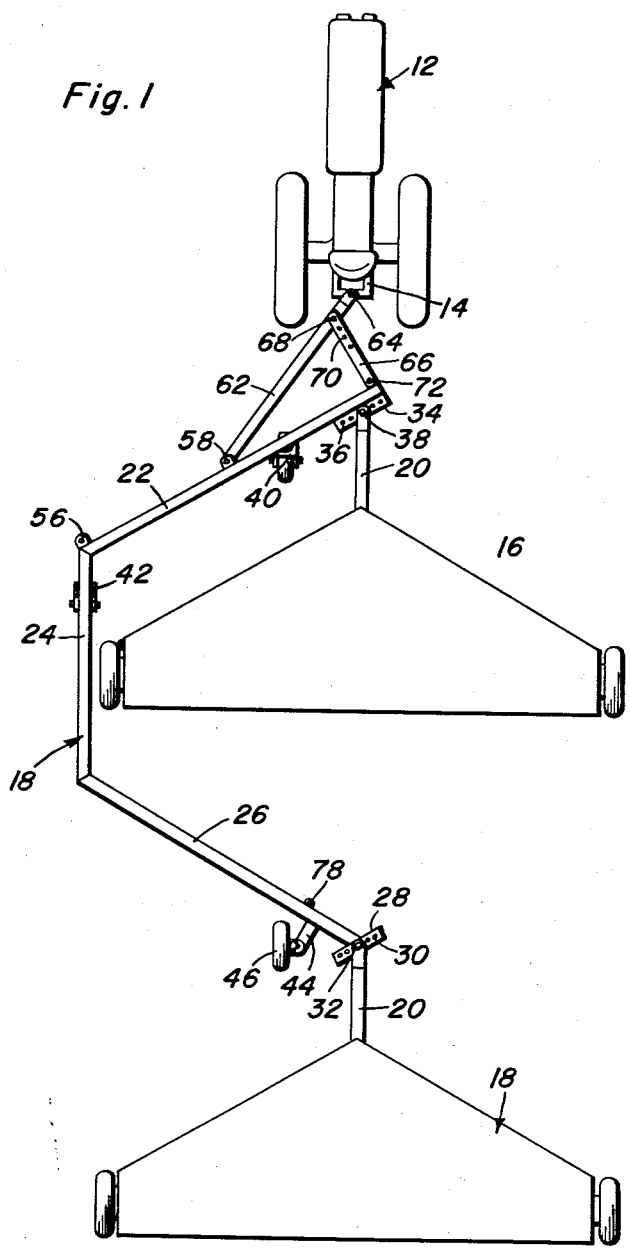
Figure 1 is a plan view of the tractor and double implements in which the drawbar of the present invention is incorporated and is in an over the road setting.
Figure 2:
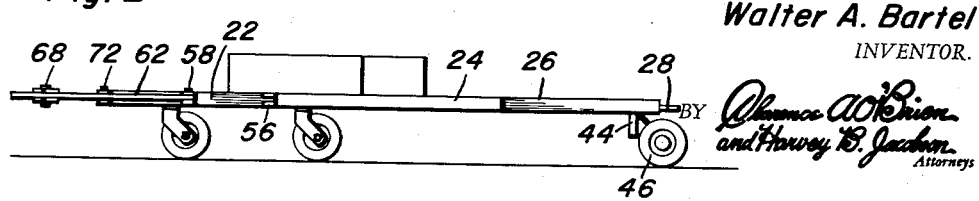
Figure 2 is a side elevational view of the drawbar per se.

Referring now specifically to the drawings, the numeral 10 generally designates the drawbar of the present invention which is adapted to be connected to any conventional farm tractor or other suitable towing vehicle as designated generally by the numeral 12 and which includes a tractor drawbar 14 of conventional construction. Illustrated in the present instance rather schematically is a pair of grain drills generally designated by the numerals 16 and 18 respectively, each of which is provided with a forwardly projecting tongue 20.

The drawbar assembly 10 of the present invention includes a plurality of structural elements which may be in the form of tubular pipe or I-beam structures including a first rail 22, a second rail 24 disposed in obtuse angular relation to the rail 22. A third rail 26 extends in obtuse angular relation to the second rail 24. The rails 22, 24 and 26 are all rigid in relation to each other and the included angle between the rail 24 and the rails 22 and 26 is substantially equal with the rails 22 and 26 extending outwardly in diverging relation to each other with all of the rails being in the same horizontal plane.

At the rear or trailing end of the rail 26, there is provided a transverse horizontal plate 28 having a series of longitudinally spaced apertures 30 in which may be inserted a removable pin 32 which also is inserted through the tongue 20 of the implement 18 thereby connecting the tongue 20 adjustably to the plate 28.

Figure 3:
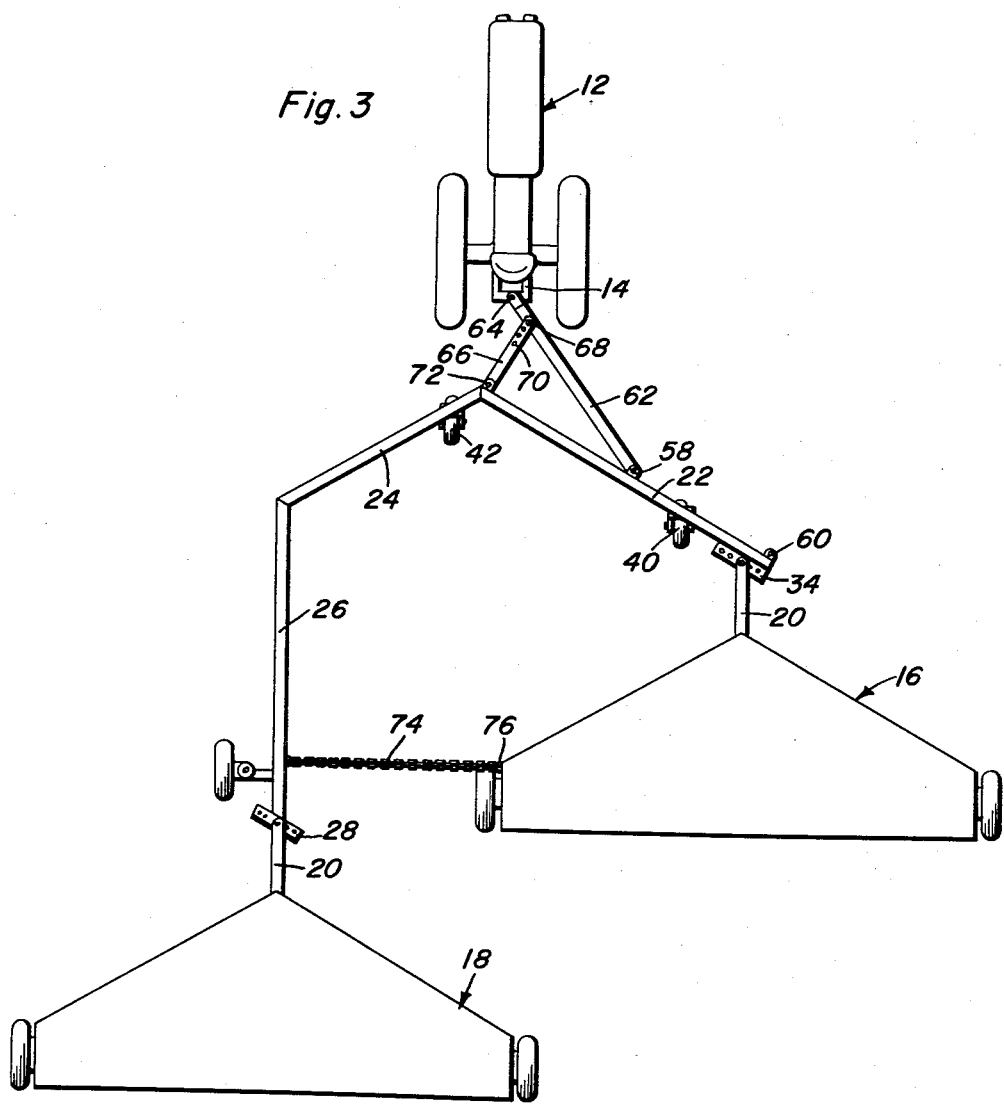
Figure 3 is a top plan view of the assembly of Figure 1 with the implements and the drawbar being in a field setting.
Figure 4:
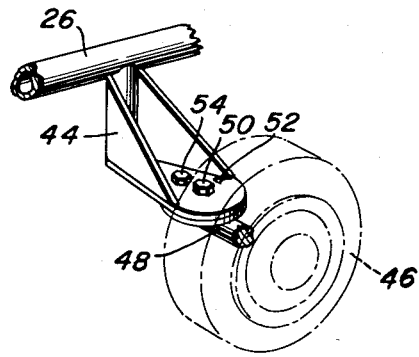
Figure 4 is a detailed perspective view illustrating the adjustable wheel setting that is a trailing wheel on the drawbar assembly.

At the end of the rail 22 remote from the rail 24 and on the trailing edge thereof is a horizontal plate 34 having a series of apertures 36 therein which removably receive a pin 38 which also extends through the tongue 20 thus detachably and adjustably securing the tongue 20 to the plate 34. The pins 38 and 32 enable the tongues 20 to swing about the vertical axis formed by such pins. Also, the adjustment apertures 30 and 36 enable the path of movement of the implements 16 and 18 to be laterally adjusted so that they will have the proper degree of spaced relationship. Actually, the working path of the implements will not overlap but the wheels and perhaps an adjacent part of the frame of each of the implements will overlap slightly in their field setting as illustrated in Figure 3.

The first rail 22 is provided with a depending caster wheel assembly 40 intermediate the ends thereof but nearer the plate end thereof. The second rail 24 is provided with a caster wheel assembly 42 only slightly spaced rearwardly from its point of juncture with the first rail 22.

The third rail 26 is provided with a depending and laterally extending bracket 44 which pivotally supports a wheel 46 having a mounting plate 48 pivotally connected to the bracket 44 by virtue of a pivot bolt 50. Alignable apertures 52 in the bracket 44 and the plate 48 which receive a removable pin or bolt 54 enable the direction of the wheel 46 to be altered about a vertical axis and locked in the adjusted position.

The first rail 22 is provided with a forwardly extending apertured lug 56 at the end thereof connected to the second rail 24, an apertured lug 58 adjacent the center thereof and an apertured lug 60 at the outer or free end thereof. Pivotally connected to the lug 58 is a swivel hitch or bar 62 that is connected to the tractor drawbar 14 in the usual manner such as by a removable pin 64. Pivotally attached to the hitch 62 only slightly rearwardly of the tractor drawbar 14 is a connecting link 66 which is pivoted to the hitch 62 by virtue of a removable pin 68 inserted into one of a plurality of longitudinally spaced apertures 70 therein for varying the angular relationship of the hitch 62, the first rail 22 and the connector or link 66 which has the other end thereof pivotally connected to the lug 60 by virtue of a removable pin 72.

When the device is employed with a field setting, a flexible chain 74 extends between an eye member 76 on the implement 16 and an eye member 78 on the third rail 26 adjacent the rear end thereof to prevent excessive wandering of the implements and especially of the rear implement 18.

When converting the assembly from a field setting to a road setting, it is unnecessary to unhook the implements and it is unnecessary to unhook the tractor. For example, when the tractor is pulling two implements each being 12 feet wide or having 12 foot swath thereby covering 24 feet for each pass across the field, such implements can be set for road travel so one implement follows behind the other so that when you are travelling down the road, the implements only require the space of the width of one implement. In order to change from the field setting as illustrated in Figure 3 to the road setting illustrated in Figure 1, it is only necessary to remove the pin 72 from the lug 56, swing the link 66 over and then insert the pin 72 through the lug 60. Of course, this will require some maneuvering of the tractor but the tractor does not have to be unhooked from the swivel hitch 62. Also, a setting of the wheel 46 is required so that the wheel will parallel the direction of movement of the tractor 12. The various adjustments provided where the implements hook to the drawbar assembly are for the purpose of accommodating different sizes of implements so that the caster wheels 42 and 40 will follow the direction of the tractor and the entire drawbar assembly is self-supporting and is employed solely as a towing device for the double implements.

On this particular drawbar the operator can make a complete turn to the left and a complete turn to the right with both implements hooked to the drawbar. This can be done with the drawbar in field setting or road setting. This may not seem important but it is especially where they farm on contour and do not farm around the field but rather start on one side of the field and farm back and forth and turn around on each end. Thus, the operator can make a complete turn with this drawbar in operation.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A double implement drawbar for towing two implements behind a towing vehicle comprising a substantially U-shaped frame disposed in horizontal position, ground engaging wheels supporting said frame, means at the free end of each leg of the U-shaped frame for connection with an implement, the lateral horizontal dimension of the legs of the U-shaped frame being at least equal to one-half of the width of the implement so that the bight portion of the U-shaped frame and the implement may be disposed in perpendicular relation to each other with the bight portion of the U-shaped frame being parallel with the path of movement of the tractor whereby the implements attached to the free ends of the legs of the U-shaped frame will be disposed in tandem relation for over the road movement, and means on one of said legs for attachment to a tractor, said means including a hitch pivotally connected to the center of one leg, and means connecting the hitch in angular relation to said leg for orientating the hitch in different angular positions whereby the pulling force will be exerted from the outer end of said one leg for orientating the implements in tandem relation or applied from the juncture between the leg and the bight portion whereby the implements will trail the frame in side-by-side relation for a field setting.

2. The structure as defined in claim 1 wherein said wheel means includes a pair of caster wheels adjacent the forward end of the frame, and an adjustable wheel adjacent the rear of the frame for adjustment of the rear wheel into parallel relation to the path of movement of the tractor and implements.

3. The structure as defined in claim 2 wherein said means connecting the outer ends of the legs of the U-shaped frame with the implements include an apertured horizontal plate for lateral adjustment of the implement in relation to the U-shaped frame.

4. The combination of claim 3 wherein said means for attachment to a tractor drawbar includes a swivel hitch pivotally mounted adjacent the center of one of said legs, and a link detachably interconnecting the swivel with selected ends of the leg for retaining the hitch in angular adjusted position in relation to the U-shaped member for exerting the pulling force at opposite ends of said one leg of the U-shaped member.

References Cited in the file of this patent

UNITED STATES PATENTS

| 2,658,770 | Koenig | Nov. 10, 1953 |
| 2,709,085 | Stueland | May 24, 1955 |
| 2,716,854 | Scheibner | Sept. 6, 1955 |

FOREIGN PATENTS

| 148,178 | Sweden | Dec. 21, 1954 |